(12) United States Patent
Wu (10) Patent No.: US 7,641,839 B2
(45) Date of Patent: Jan. 5, 2010

(54) METHOD FOR FABRICATING A THREE DIMENSIONAL EMBLEM

(76) Inventor: Ming-Yuan Wu, 2F, No. 9, Alley 37, Lane 236, Sec. 5, Chung-Xiao E. Rd., Xinyi District, Taipei City 110 (TW)

( * ) Notice: Subject to any disclaimer, the term of this patent is extended or adjusted under 35 U.S.C. 154(b) by 205 days.

(21) Appl. No.: 11/675,695

(22) Filed: Feb. 16, 2007

(65) Prior Publication Data

US 2008/0197530 A1 Aug. 21, 2008

(51) Int. Cl.
*B29C 53/00* (2006.01)
*B29C 53/02* (2006.01)

(52) U.S. Cl. ....................... 264/293; 264/132

(58) Field of Classification Search ................. 264/293, 264/132
See application file for complete search history.

(56) References Cited

U.S. PATENT DOCUMENTS 6,264,869 B1 * 7/2001 Notarpietro et al. ......... 264/247
6,701,652 B1 * 3/2004 McElhatton et al. .......... 40/615
2003/0184894 A1 * 10/2003 Bischof et al. .............. 359/894
2003/0216125 A1 * 11/2003 Ward et al. .................... 455/95

* cited by examiner

*Primary Examiner*—Joseph S. Del Sole
*Assistant Examiner*—Lorraine Rios
(74) *Attorney, Agent, or Firm*—Ming Chow; Sinorica, LLC (57) ABSTRACT

A method for fabricating a three dimensional emblem is disclosed. An indentation is formed in the back surface of a piece of transparent material. Multiple colors are printed to form a pattern or emblem in the indentation. After printing, the indentation is filled with resin to make the back surface of the piece of transparent material flat. A second indentation is then formed in the filled indentation. When the front surface of the transparent material is viewed, the emblem appears as a three dimensional emblem. Since the emblem is under the front surface of the transparent material, the three dimensional emblem is protected and cannot be inadvertently dislodged from the transparent material.

10 Claims, 11 Drawing Sheets

METHOD FOR FABRICATING A THREE DIMENSIONAL EMBLEM

BACKGROUND OF THE INVENTION

1. Field of the Invention

The present invention relates to fabricating an emblem. More specifically, the present invention discloses a method for efficiently fabricating an emblem that appears three dimensional but does not protrude from a flat surface.

2. Description of the Prior Art

Emblems are utilized on a wide variety of products to convey a message or identify a brand or product. Conventional emblems are typically glued onto the surface of the product. As such, the emblem is on top of the product's face surface and can easily be dislodged from the product by normal contact. If the emblem falls off the product, the product's appearance is marred thus adversely affecting the consumer's impression of the brand or product.

Another conventional type of emblem is a sticker. The sticker bears a logo or brand name and is adhered to the product. While inexpensive and simple to produce, the sticker's adhesive can easily deteriorate over time and the sticker will come off the product.

Screen-printing is another common way of producing a logo. Text or a brand name is printed onto the face of the product. However, screen-printing in this way limits the logo to a basic two dimensional logo. Additionally, the screen-printed logo is exposed and can easily wear off.

Figure 1:
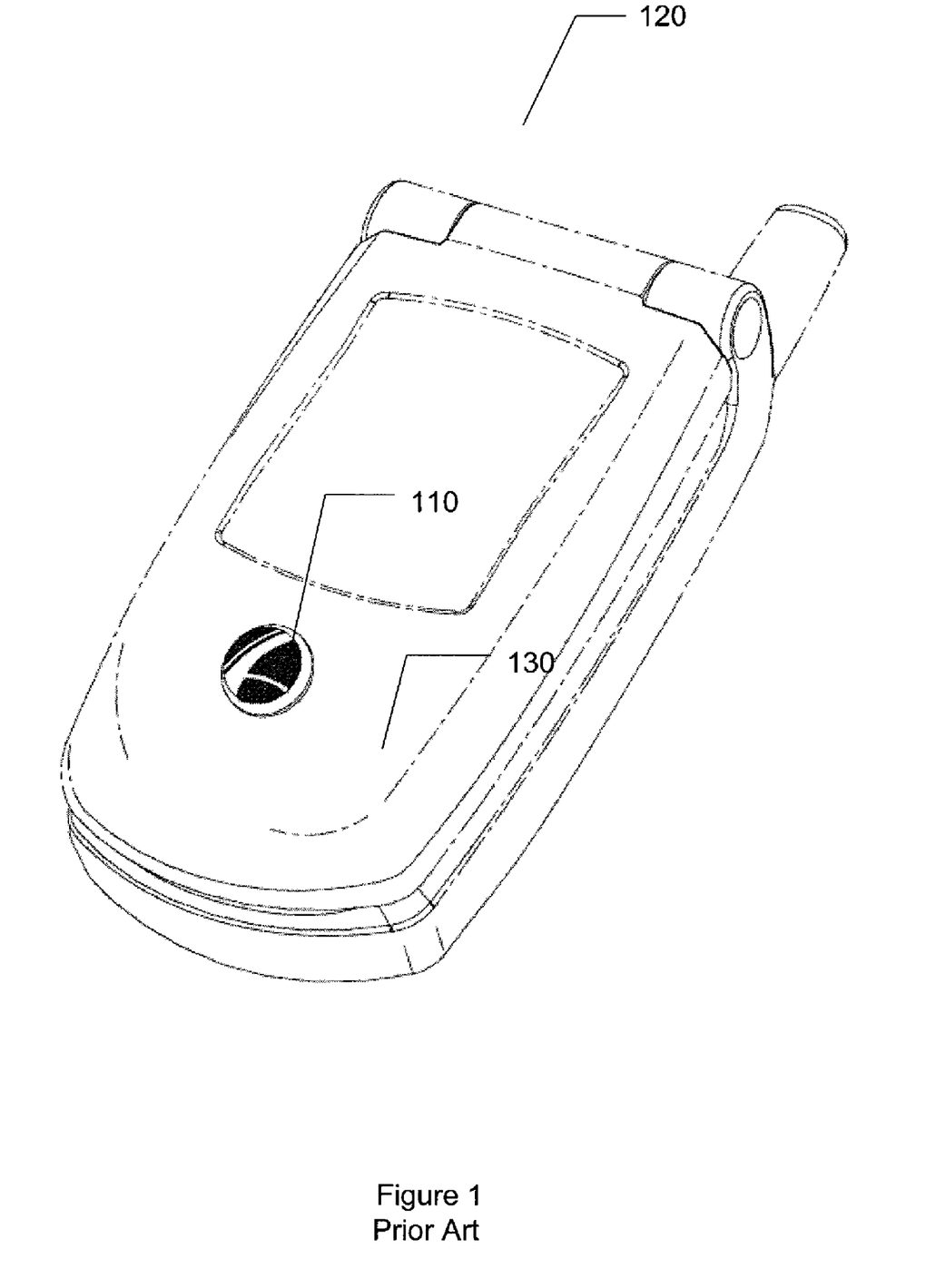
FIG. 1 is a drawing illustrating a conventional emblem of the prior art.

Refer to FIG. 1, which is a drawing illustrating a conventional emblem of the prior art.

An emblem 110 is glued onto the front surface 130 of a mobile telephone 120 with an adhesive. The emblem 110 is raised from the mobile telephone's surface 130 and exposed to the environment. When the mobile telephone 120 is used, stored, or manipulated, the emblem 110 comes in contact with external objects. As a result, the emblem 110 can easily be dislodged from the mobile telephone 120. When this occurs the brand's image is adversely affected.

Typically the conventional logo or emblem is two dimensional. While being functional the conventional logo does not add to the value of the product. In many cases the logo detracts from the appearance of the product.

Therefore, there is need for an improved method of fabricating a three dimensional emblem that allows the emblem to be easily seen but protects the emblem from being inadvertently removed from a product bearing the emblem.

SUMMARY OF THE INVENTION

To achieve these and other advantages and in order to overcome the disadvantages of the conventional method in accordance with the purpose of the invention as embodied and broadly described herein, the present invention provides a method for fabricating an emblem that appears three dimensional but does not protrude from a flat surface.

The three dimensional emblem produced by the method of the present invention is visually distinctive and enhances the quality of the product bearing the emblem.

The method of the present invention is utilized to produce a three dimensional emblem for a wide variety of products. For example, the three dimensional emblem is produced for a mobile phone, display area of a mobile phone, PDA, portable computer, or other type of product having a transparent portion or part.

In an embodiment of the present invention the method comprises providing a piece of transparent material. The transparent material comprises, for example, polycarbonate (PC), polymethylmethacrylate (PMMA), acrylic, glass, plastic, or other transparent material. An indentation is formed in the back side of the transparent material and the surface of the transparent material with the indentation is polished. Color is then applied to the indentation, for example by screen-printing to produce the emblem. After the coloring process is complete the remaining empty portion of the indentation is filled, for example, with resin, transparent material, or semi-transparent material. After hardening, a second indentation is formed in the top of the filled first indentation. When viewed from the front surface of the transparent material, the emblem appears as a three dimensional emblem. The emblem does not protrude from the front surface of the transparent material.

In this way, when the front of the transparent material is observed the emblem is easily seen as a three dimensional emblem. An advantage of the present invention is that a three dimensional emblem is produced that doesn't protrude from the front surface of the transparent material.

In another embodiment of the present invention the method for fabricating a three dimensional emblem comprises molding a piece of transparent material. In the molding process an indentation is formed in the back surface of the transparent piece. The indentation is formed in a desired shape for the three dimensional emblem. The emblem is produced by applying color or multiple colors to the indentation. After coloring, a second indention is formed in the colored indentation to produce the three dimensional effect of the emblem.

In another embodiment of the present invention the method comprises printing colors into the indentation after the indentation is formed. Then a colored material, for example a semi-transparent material is inserted into the indentation and adhered to the transparent material's indentation. The colored material has an indentation or indentations in the back surface. These indentations result in the emblem appearing three dimensional.

In another embodiment of the present invention the method comprises molding a transparent material having an indentation in the molded transparent material. After molding, the transparent material is inserted into a second mold and the first indentation is filled with colored material to produce an emblem. During the second molding process a second indentation is formed in the colored material. This second indentation causes the emblem to appear three dimensional when viewed from the front surface of the molded transparent material.

In another embodiment of the present invention the method comprises engraving or etching a pattern or shape into the back side of a piece of transparent material. The engraving is performed, for example, by CNC machining. The pattern is the basis for the three dimensional emblem. The pattern is then colored, for example, by printing. Since the pattern is contoured the emblem will appear three dimensional.

In the method of the present invention in another embodiment the pattern is colored with multiple colors. For example, after the contoured pattern is created in the transparent material a first color is printed into the pattern with portions of the color masked in order to leave portions of the pattern exposed. A second color is then printed into the pattern. The varying contours and depths of the pattern when colored create a three dimensional effect for the emblem.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 2A:
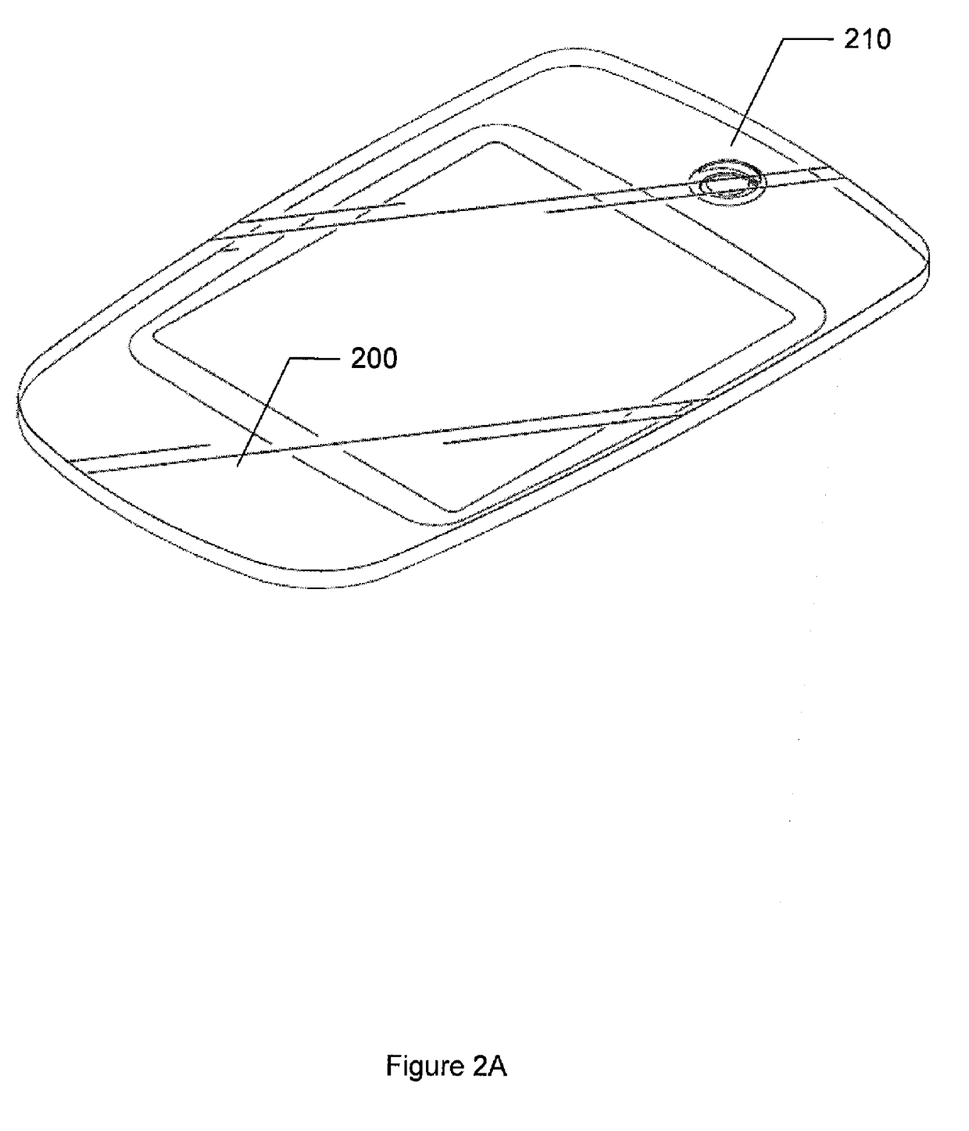
FIG. 2A is a drawing illustrating a three dimensional emblem according to an embodiment of the present invention.
Figure 2B:
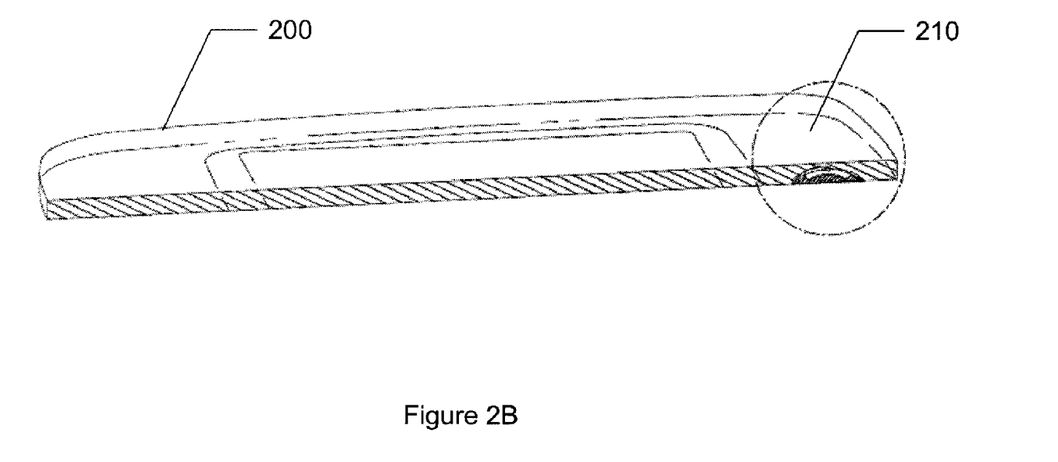
FIG. 2B is a cross-sectional view of the three dimensional emblem according to an embodiment of the present invention.
Figure 2C:
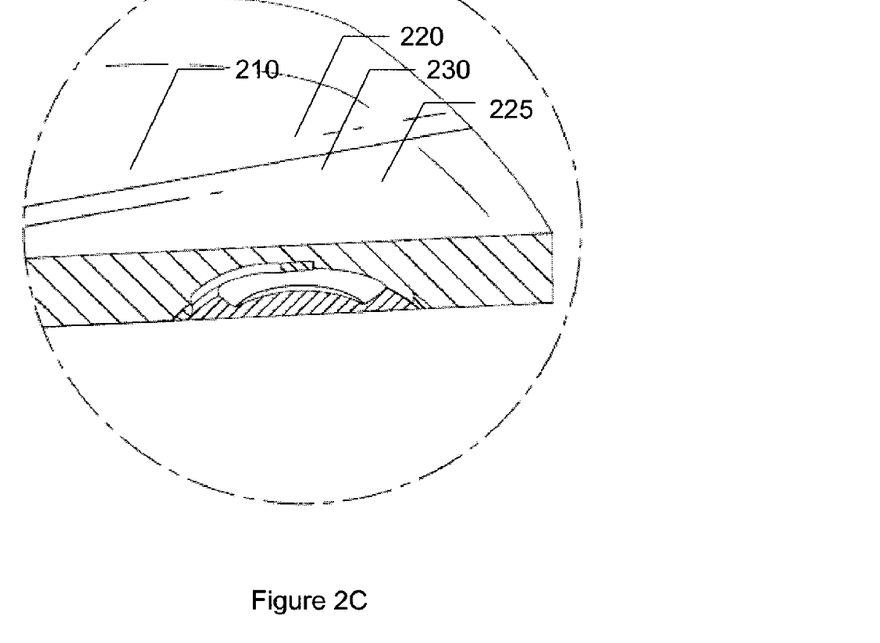
FIG. 2C is an enlarged view of the three dimensional emblem illustrated in FIG. 2B.

Refer to FIG. 2A, which is a drawing illustrating a three dimensional emblem according to an embodiment of the present invention, to FIG. 2B, which is a cross-sectional view of the three dimensional emblem according to an embodiment of the present invention, and to FIG. 2C, which is an enlarged view of the three dimensional emblem illustrated in FIG. 2B.

In the embodiment illustrated in FIGS. 2A, 2B, and 2C, the method of the present invention is utilized to produce a three dimensional emblem 200 in the display cover 210 of a mobile phone. However, the present invention can be used to produce a three dimensional emblem in a wide variety of products.

An indentation is formed in the back surface of the display cover 210. A first color 225 is printed into portions of the indentation. The indentation is masked so that portions of the first color 225 are printed into the indentation and portions of the indentation are not printed on by the first color 225. Next, the exposed portions of the indentation are printed by a second color 230. Finally, the remaining empty portion of the indentation is filled with, for example, resin 220 to make the back side of the display cover 210 substantially flat and smooth. As a result, when the front side of the display cover 210 is observed the three dimensional emblem 200 is easily seen and creates a three dimensional effect as an emblem.

In an embodiment of the present invention the method further comprises forming a second indentation in the filled indentation to further enhance the emblem's three dimensional effect.

Figure 3A:
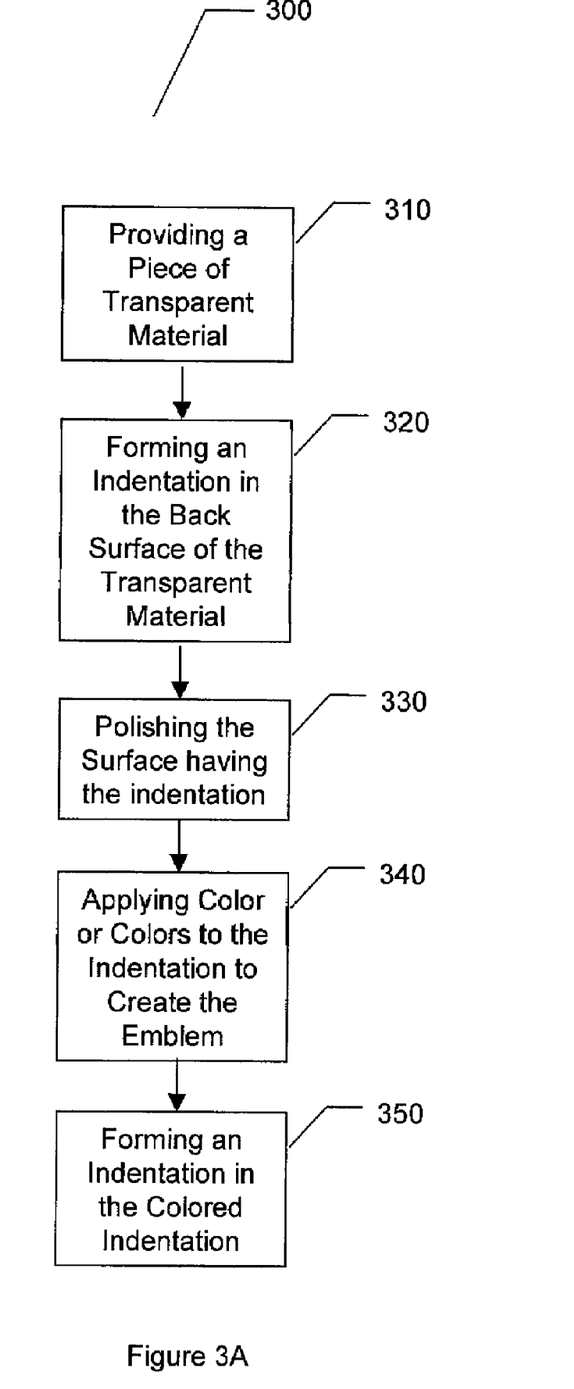
FIG. 3A is a flowchart illustrating a method for fabricating a three dimension emblem according to an embodiment of the present invention.

Refer to FIG. 3A, which is a flowchart illustrating a method for fabricating a three dimension emblem according to an embodiment of the present invention.

In the embodiment of the present invention illustrated in FIG. 3A the method 300 comprises providing a piece of transparent material in Step 310. The transparent material comprises, for example, polycarbonate (PC), polymethylmethacrylate (PMMA), acrylic, glass, plastic, or other transparent material. An indentation is formed in the back side of the transparent material in Step 320. The indentation is formed by, for example, drilling, etching, or CNC machining. The shape of the indentation is, for example, a round concaved shape. In Step 330 the surface of the transparent material with the indentation is polished. In Step 340 color or colors are applied to the indentation to create the emblem. The colors comprise, for example, screen-printing colors or colored resin. Finally in Step 350, an indentation is formed in the colored indentation to cause the emblem to appear three dimensional when viewed.

In this way, when the front of the transparent material is observed the emblem is easily seen as a three dimensional emblem. An advantage of the present invention is that a three dimensional emblem is produced that doesn't protrude from the front surface of the transparent material.

Figure 3B:
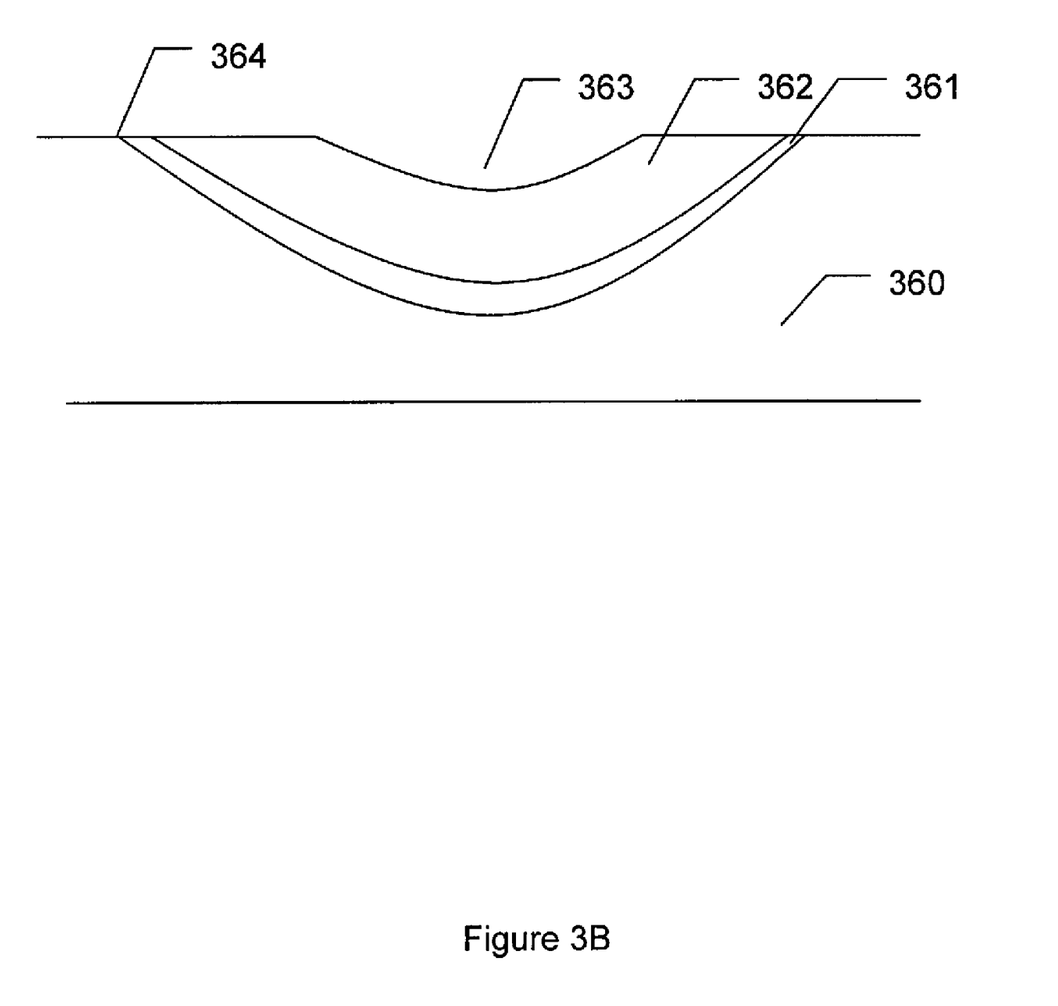
FIG. 3B is a drawing illustrating a three dimensional emblem according to an embodiment of the present invention.

Refer to FIG. 3B, which is a drawing illustrating a three dimensional emblem according to an embodiment of the present invention.

As shown in FIG. 3B, a first indentation 364 is formed in a piece of transparent material 360. A first color 361 and a second color 362 are applied to the first indentation 364. A second indentation 363 is formed in the colored indentation to form the three dimensional emblem.

Figure 4:
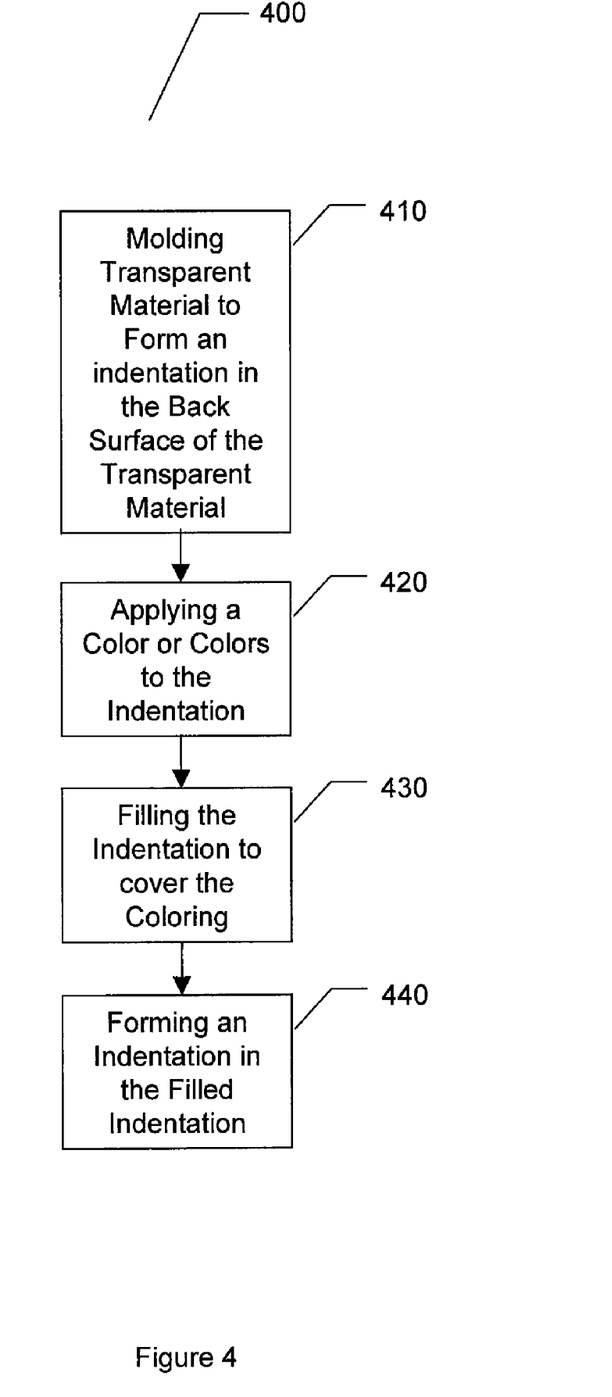
FIG. 4 is a flowchart illustrating a method for fabricating a three dimension emblem according to an embodiment of the present invention.

Refer to FIG. 4, which is a flowchart illustrating a method for fabricating a three dimension emblem according to an embodiment of the present invention.

In the embodiment of the present invention illustrated in FIG. 4 the method 400 for fabricating a three dimensional emblem comprises molding a piece of transparent material in Step 410. In the molding process an indentation is formed in the back surface of the transparent piece. The emblem is created in the indentation in Step 420 by applying color or colors to the indentation. The colored indentation is then filled in order to make the back surface of the transparent piece flat or smooth in Step 430. An indentation is formed in the filled indentation in Step 440. This second indentation is smaller than the first indentation. In an embodiment of the present invention the first indentation is a round concaved shape and the second indentation is a round concaved shape of 10% to 90% in size relative to the size of the first indentation.

Figure 5:
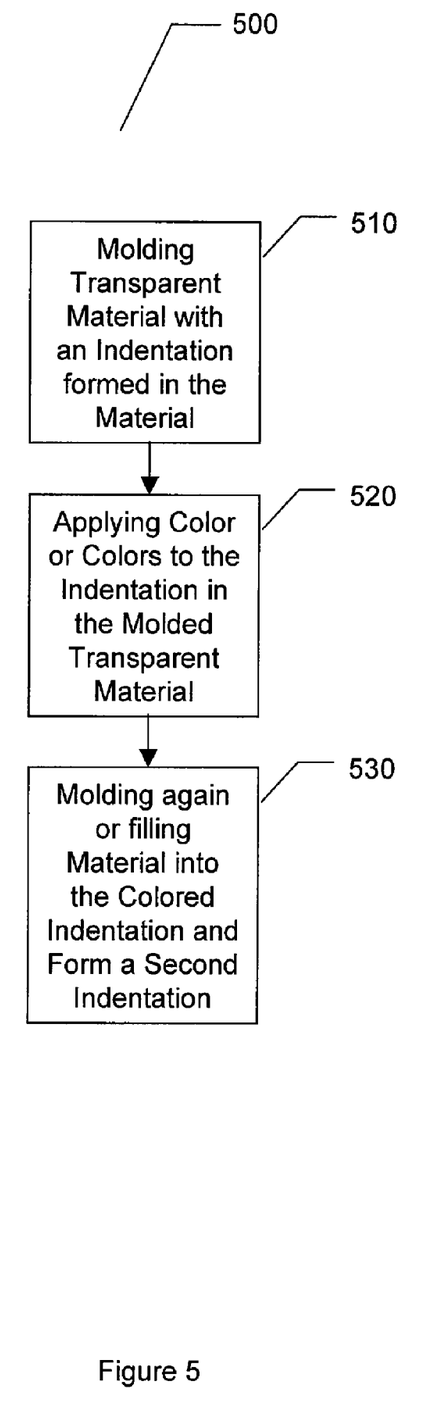
FIG. 5 is a flowchart illustrating a method for fabricating a three dimension emblem according to an embodiment of the present invention.

Refer to FIG. 5, which is a flowchart illustrating a method for fabricating a three dimension emblem according to an embodiment of the present invention.

In the embodiment of the present invention illustrated in FIG. 5 the method 500 for fabricating a three dimensional emblem comprises molding a piece of transparent material where an indentation is formed in the transparent material during the molding process in Step 510. Color is applied to portions of the indentation in the transparent material in Step 520. The transparent material is then inserted into a second mold for a second molding process or the indentation is filled with a colored material in Step 530. The colored material is, for example, a colored resin or semi-transparent colored resin. During the second molding process an indentation is formed in the colored material. The three dimensional emblem is visible from the front of the transparent material but doesn't extend above the surface of the transparent material.

Figure 6A:
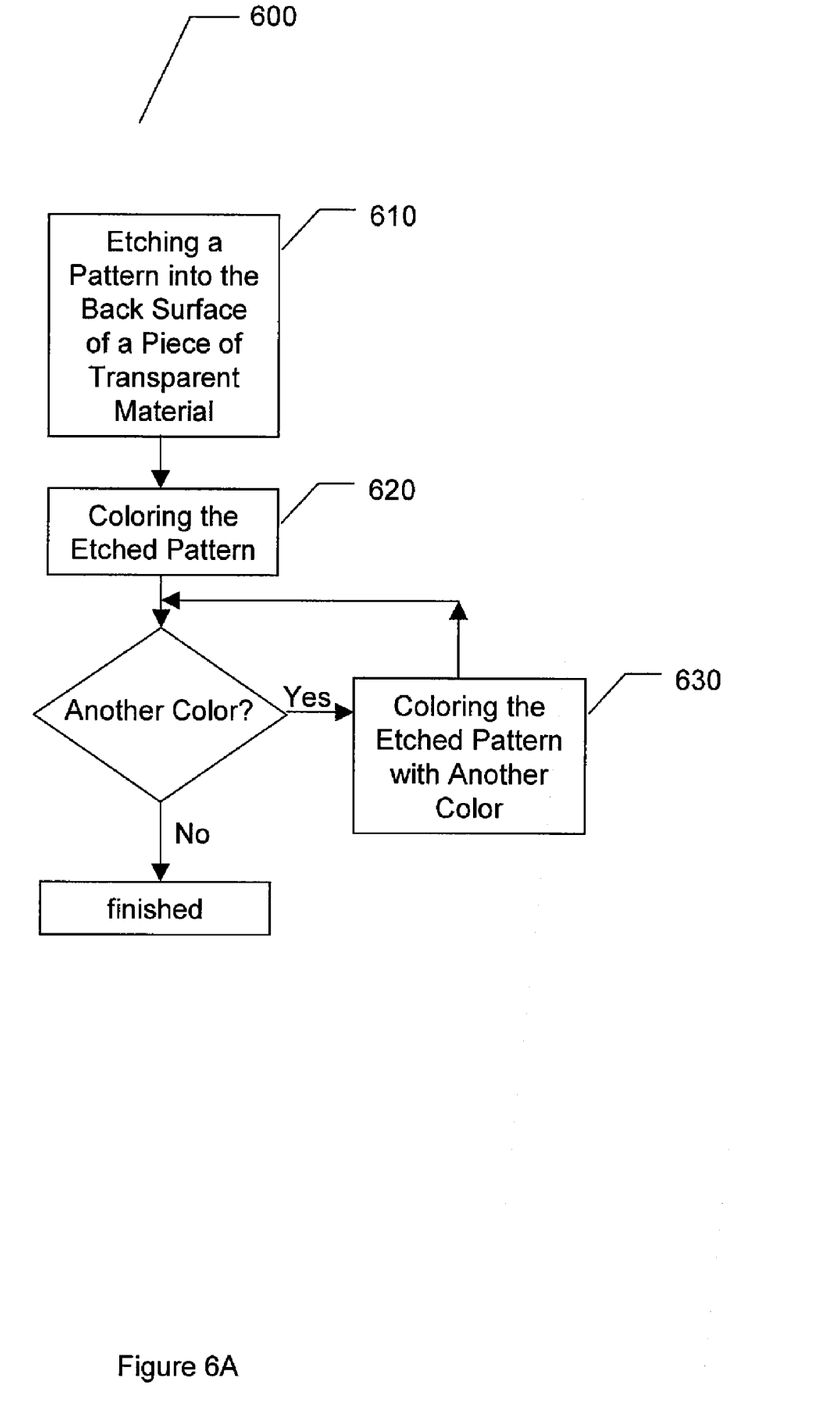
FIG. 6A is a flowchart illustrating a method for fabricating a three dimension emblem according to an embodiment of the present invention.
Figure 6B:
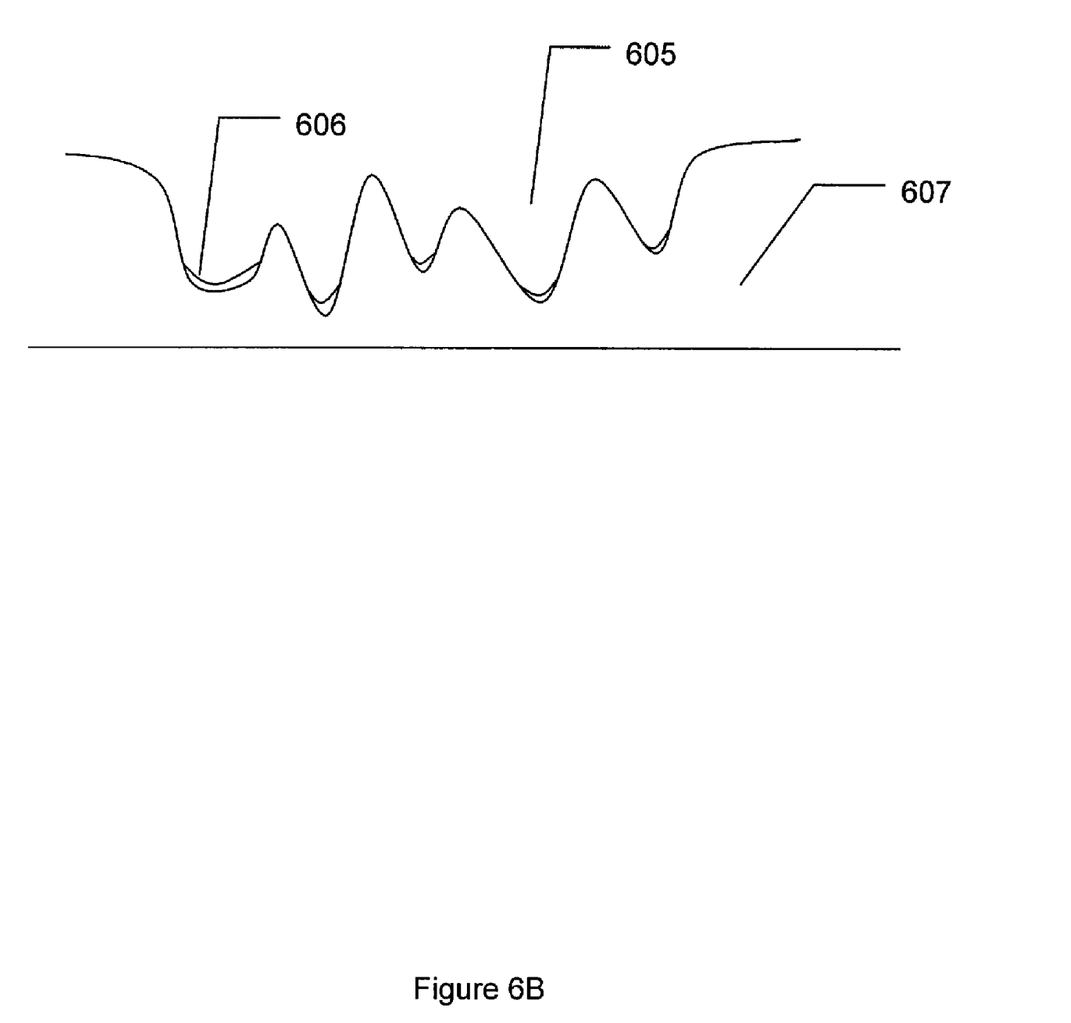
FIG. 6B is a cross-sectional view illustrating a pattern and printing for a three dimensional emblem according to an embodiment of the present invention.

Refer to FIG. 6A, which is a flowchart illustrating a method for fabricating a three dimension emblem according to an embodiment of the present invention and to FIG. 6B, which is a cross-sectional view illustrating a pattern and printing for a three dimensional emblem according to an embodiment of the present invention.

In the embodiment of the present invention illustrated in FIG. 6 the method 600 comprises engraving or etching a pattern or shape into the back side of a piece of transparent material in Step 610. The pattern is the basis for the three dimensional emblem. The pattern is then colored, for example, by printing 620. Since the pattern is contoured and has varying depth, the emblem will appear three dimensional.

In the method 600 of the present invention in another embodiment the pattern is colored with multiple colors. For example, after the contoured pattern is created in the transparent material in Step 610 a first color is printed into the pattern with portions of the color masked in order to leave portions of the pattern exposed in Step 620. A second color is then printed into the pattern Step 630.

As shown in FIG. 6B, the pattern 605 is contoured and extends to various depths. In this way, after the pattern 605 is colored by the printing 606 the pattern will have a three dimensional effect when viewed from the front of the transparent material 607.

Figure 7A:
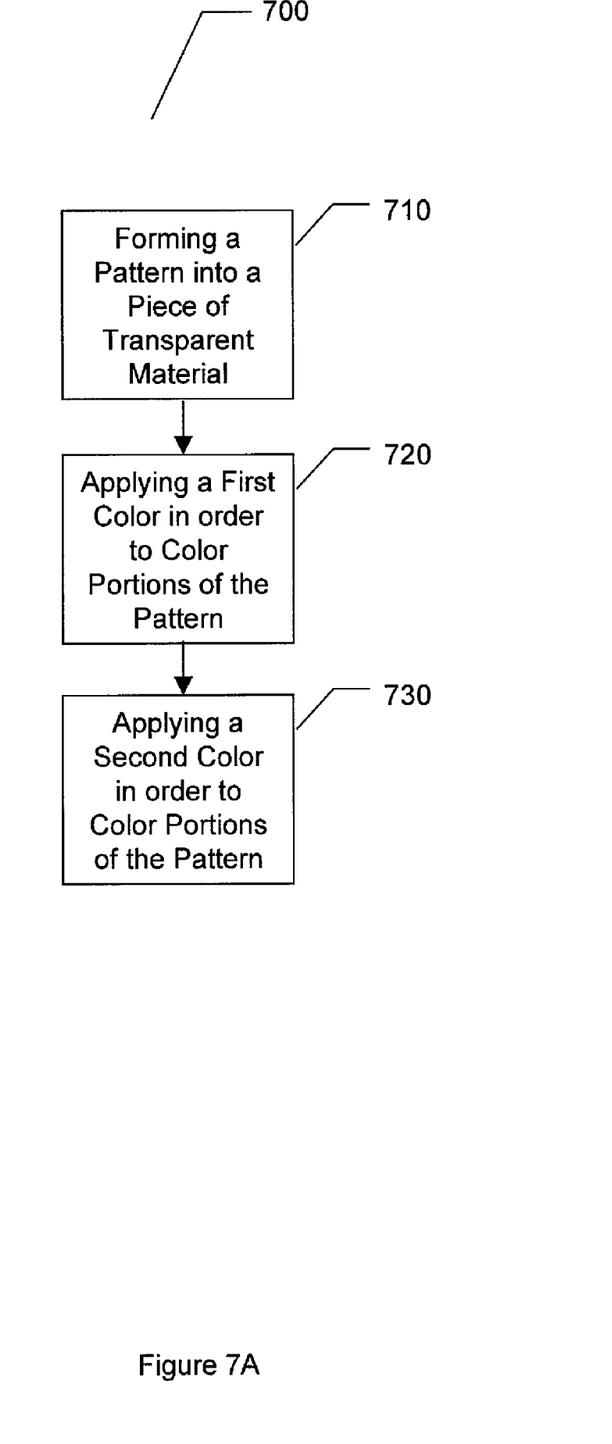
FIG. 7A is a flowchart illustrating a method for fabricating a three dimension emblem according to an embodiment of the present invention.
Figure 7B:
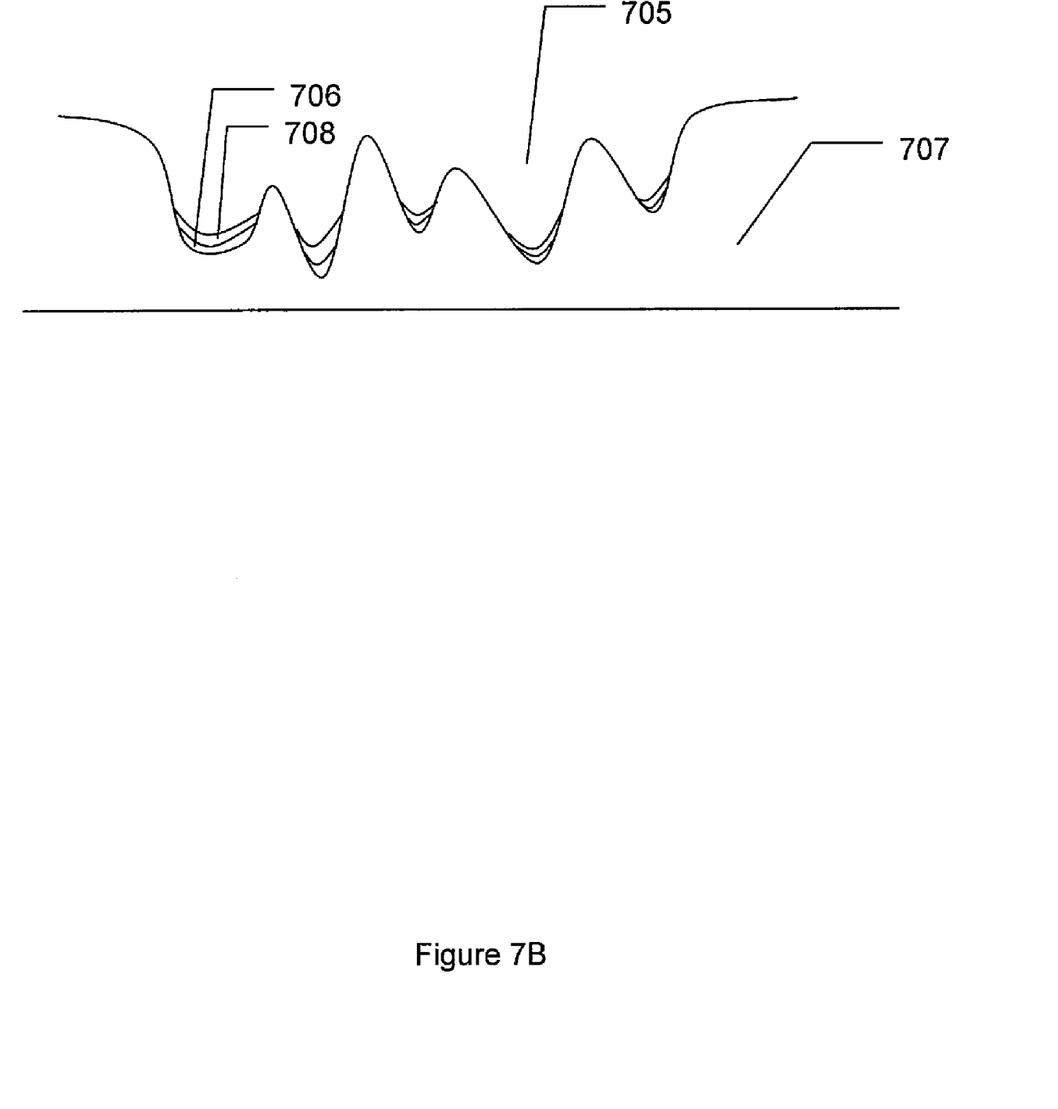
FIG. 7B is a cross-sectional view of a three dimensional emblem according to an embodiment of the present invention.

Refer to FIG. 7A, which is a flowchart illustrating a method for fabricating a three dimension emblem according to an embodiment of the present invention and to FIG. 7B, which is a cross-sectional view of a three dimensional emblem according to an embodiment of the present invention.

In the embodiment of the present invention illustrated in FIG. 7A the method 700 comprises forming a pattern in a piece of transparent material in Step 710. A first color is printed into the pattern in Step 720. The first color only covers a portion of the pattern. A second color is then printed into the pattern in Step 730.

As shown in FIG. 7B, the pattern 705 has varying depths and contours. The first color 706 and the second color 708 cover various portions of the pattern 705 and are visible from the front of the transparent material 707 at various areas.

In another embodiment of the present invention the method for fabricating a three dimensional emblem comprises molding transparent material so that a pattern is formed in the molded material. The pattern comprises, for example, a logo, a shape, text, or abstract art. Color or colors are added to the pattern, for example, by screen-printing. Since the walls of the pattern and the depth of the pattern's indentation vary, a three dimensional effect is created. This method provides a low cost means of producing a high quality three dimensional emblem easily by creating a pattern for the emblem while molding the transparent material. Then the pattern is simply printed to add color for the emblem. When viewed from the front side of the transparent material, the effective three dimensional emblem is seen.

In another embodiment of the present invention the method comprises applying color to an indentation or pattern in a transparent or semi-transparent material. Then a colored material, for example a semi-transparent material is inserted into the indentation and adhered to the transparent material's indentation. The colored material has an indentation or indentations in the back surface. These indentations result in the emblem appearing three dimensional. In an embodiment of the present invention after an indentation is formed in the transparent material and indentation is printed, the indentation is filled to make the surface of the transparent material substantially flat. In another embodiment of the present invention the indentation is not filled after color is applied. In another embodiment of the present invention after the indentation has been printed and filled, a second indentation is formed in the filled first indentation. This second indentation further increases the three dimensional effect of the emblem.

As described, the method for fabricating a three dimensional emblem of the present invention provides an effective and efficient way of producing an emblem in a transparent material that creates a three dimensional effect. The method also produces a three dimensional emblem that does not protrude or extend above the surface thereby preventing inadvertent dislodging of the emblem.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for fabricating a three dimensional emblem comprising:

providing a piece of transparent material having a front surface and a back surface;

molding said piece of transparent material with a first indentation, in a first concaved shape, formed in said back surface of said piece of transparent material;

applying at least one color to said first indentation;

filling said first indentation with resin so that said back surface of said transparent material is flat; and after said resin is hardening, forming a second indentation, in a second round concaved shape, on the top of said filled first indentation such that said second indentation is smaller than said first indentation to produce said three dimensional emblem, wherein said second indentation is formed by drilling.

2. The method for fabricating a three dimensional emblem of claim 1, the transparent material comprising polycarbonate (PC), polymethylmethacrylate (PMMA), acrylic, glass, or plastic.

3. The method for fabricating a three dimensional emblem of claim 1, further comprising:

polishing the back surface of the transparent material after the indentation is formed.

4. The method for fabricating a three dimensional emblem of claim 1, wherein said at least one color comprising screen-printing color or colored resin.

5. The method for fabricating a three dimensional emblem of claim 1, comprising filling said first indentation with resin, transparent material, or semi-transparent material.

6. The method for fabricating a three dimensional emblem of claim 1, comprising applying multiple colors to said first indentation.

7. The method for fabricating a three dimensional emblem of claim 1, comprising forming a pattern in the piece of transparent material.

8. The method for fabricating a three dimensional emblem of claim 7, comprising printing a first color on the pattern.

9. The method for fabricating a three dimensional emblem of claim 8, comprising printing the first color on a portion of the pattern.

10. The method for fabricating a three dimensional emblem of claim 9, comprising printing a second color on the pattern.

* * * * *